United States Patent [19]

Waiche

[11] 4,246,892
[45] Jan. 27, 1981

[54] SOLAR ENERGY COLLECTOR PANEL

[76] Inventor: Meir R. Waiche, 4141 Hilldale Rd., San Diego, Calif. 92116

[21] Appl. No.: 906,462

[22] Filed: May 17, 1978

[51] Int. Cl.³ .................................................. F24J 3/02
[52] U.S. Cl. .................................... 126/443; 126/446; 126/449
[58] Field of Search ............... 126/270, 271, 432, 442, 126/444, 445, 446, 447, 448, 449; 165/183, 171, 173

[56] References Cited

U.S. PATENT DOCUMENTS

| | | | |
|---|---|---|---|
| 3,039,453 | 6/1962 | Andrassy | 165/171 |
| 3,672,446 | 6/1972 | Tibbetts et al. | 165/183 |
| 3,679,531 | 4/1969 | Wienand | 165/171 |
| 3,735,465 | 5/1973 | Tibbetts et al. | 165/183 X |
| 4,011,856 | 3/1977 | Gallagher | 165/171 X |
| 4,064,866 | 12/1977 | Knight, Jr. | 126/271 |
| 4,086,913 | 5/1978 | Gavin | 165/171 X |
| 4,114,598 | 9/1978 | Van Leeuwen | 126/271 |
| 4,117,832 | 10/1978 | Lupkas | 126/271 |
| 4,131,110 | 12/1978 | Jones, Jr. | 126/271 |

Primary Examiner—Carroll B. Dority, Jr.
Assistant Examiner—Randall L. Green
Attorney, Agent, or Firm—Charles C. Logan, II

[57] ABSTRACT

A solar energy collector panel, having an absorber plate and a frame within which the absorber plate is mounted. The absorber plate is comprised of a plurality of absorber plate sections each having interlocking structure formed along both of their lateral edges. This interlocking structure forms a tubular passage when the interlocking structure of the adjacent absorber plate sections are matingly locked together. An elongated tubing member whose external diameter is slightly larger than the internal diameter of the tubular passage is frictionally captured within each of the tubular passages. The absorber plate sections are formed of extruded metal and they have a plurality of corrugated surface portions that provide the absorber plate sections with greater surface exposure and improved absorption angles to the sun throughout the day. The thickness of the absorber plate sections is the greatest where the interlocking structure of the adjacent absorber plate sections are matingly locked together, thereby providing a greater mass for heat conduction transfer from the absorber plate sections to the elongated tubing member. The interlocking structure formed on the lateral edges of the absorber plate sections comprise a fin portion whose configuration is basically that of a cylindrical tube that has been cut in half longitudinally. A recess is formed adjacent one edge of the fin portion and a protrusion is formed adjacent the opposite edge of the fin portion. The frame has a back plate, side frame members, end frame members, and a glass top panel.

5 Claims, 4 Drawing Figures

U.S. Patent  Jan. 27, 1981  4,246,892
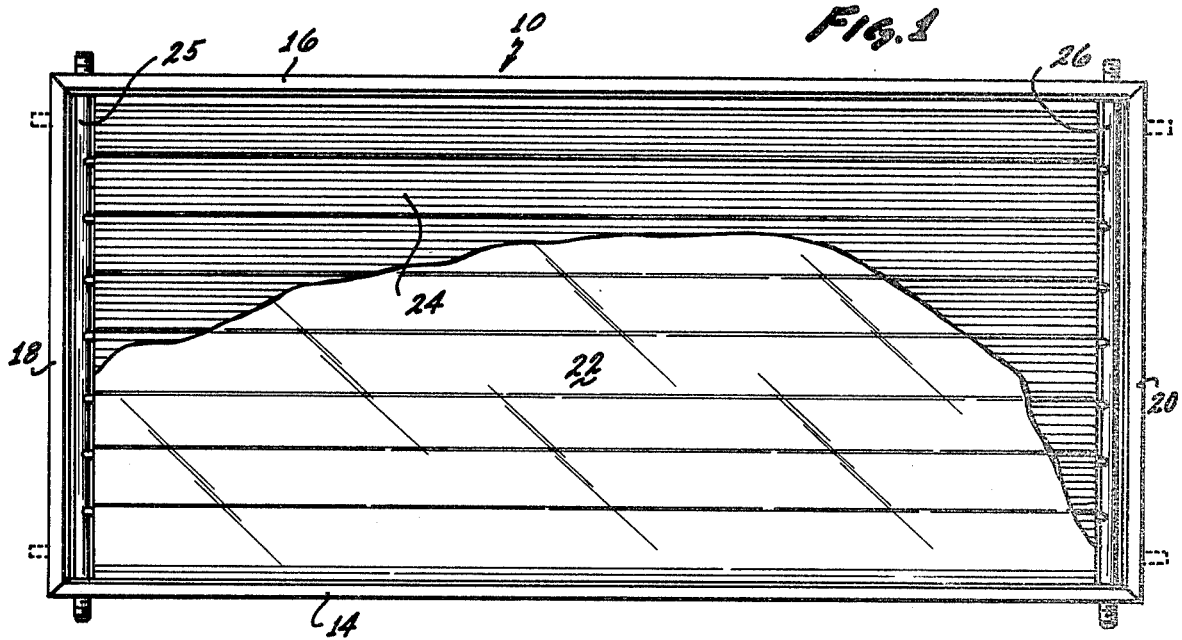
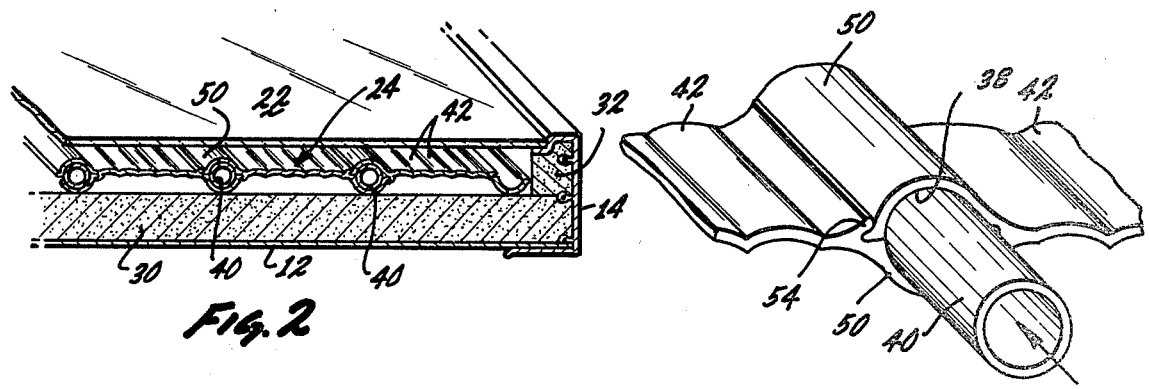
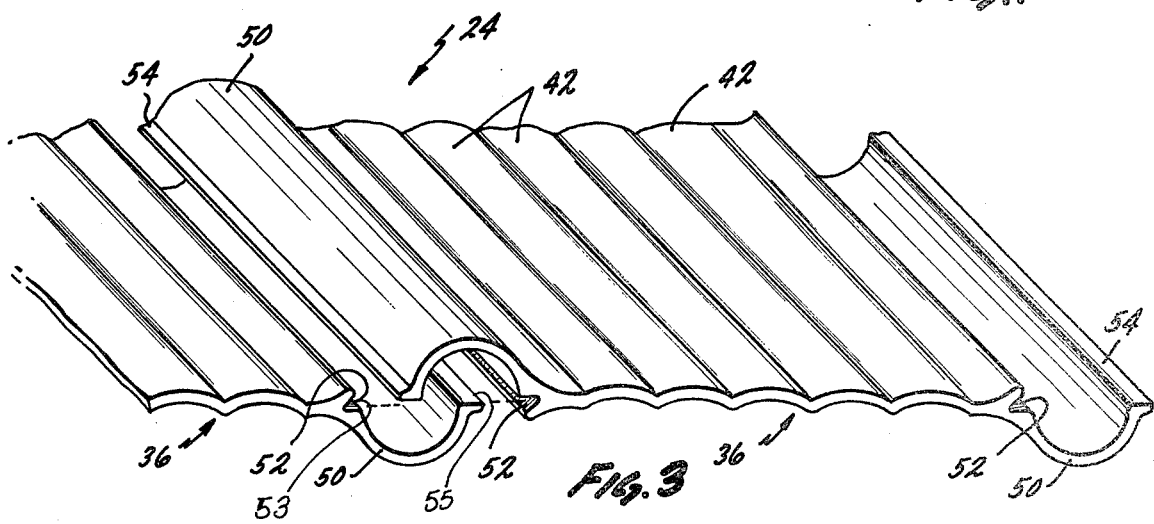

SOLAR ENERGY COLLECTOR PANEL

BACKGROUND OF THE INVENTION

This invention relates to the art of solar energy collectors, and more particularly to an improved absorber plate.

In the past solar energy collector panels have been made with various structures. An example of one structure is illustrated in U.S. Pat. No. 3,039,453 wherein the absorber plate is formed from a metallic plate which has had grooves crimped into its surface for receiving a flexible plastic tubing that would be snapped into these grooves. The configuration of these grooves is substantially circular in cross section and is greater that 180° in circumference. This allows the flexible tubing to be retained in the grooves without the use of additional fastening means if desired. This type of absorber plate structure has also been utilized with metallic tubing. However, in both instances the structure has proved to have limitations. The major problem results from the fact that the absorber plate, when it is heated by the sun's rays will cause the metal of the absorber plate to expand which causes the grooves to expand, causing them to loosen their grip on the tubing snapped therein. While the absorber plate metal is expanding, the tubing, even when it is metallic, is not expanding due to the fluid flowing therethrough which keeps the tubing relatively cool. When the grip of the grooves on the tubing has been relaxed, the efficiency of the solar energy collector panel is greatly reduced due to the lowered conduction rate of the heat from the absorber plate to the tubing.

Some additional draw-backs to the above described absorber plate results from the fact that the continued heating and cooling of the metallic absorber plate will eventually result in fatigue of the metal around the gripping portions of the grooves. When this occurs there will be a loss of conduction in the efficiency of the solar energy collector panel. Another draw-back to the structure of the absorber plate described above relates to the fact that the groove of the absorber plate is gripping the tubing around far less than its 360° of circumference. Maximum efficiency would occur where the groove contacts the tubing around its entire surface.

Another problem in prior absorber plate constructions has resulted from the use of a plurality of absorber plate sections to form the absorber plate. These absorber plate sections have inter-locking structure along their lateral edges that allow for a sliding connection to be made in the absorber plate sections. This sliding-type connection between the adjacent absorber plate sections has been necessary in order to allow for heat expansion of the metal of the absorber plate sections. A draw-back to this construction, however, is the fact that it does not provide a 100% seal against water and therefore the absorber plates formed in the manner described cannot be used as a roof structure by itself, but would require some type of a cover panel.

A further disadvantage of prior solar energy collector panels has resulted when it is necessary to have a large absorber plate. In the past it has been necessary to use a large number of solar energy collector panels that would be placed side by side and inter-connected. The resulting wall section of these solar energy collector panels make the structure more expensive than it need be.

Electrolysis resulting from the use of dis-similar metals for the absorber plate and the tubing has also been a prior problem. The cost of making the absorber plates from copper so that they would be made from the same metal tubing is prohibitive. In an effort to cut down on the electrolysis problem, some solar energy collector structures use a paint on the surface of the tubing but this results in a lower conduction efficiency. Another problem that has resulted from prior solar energy collector panels that utilize a plurality of absorber plate sections has been the fact that many of these structures lack conductance across their entire absorber plate assembly. In many instances it is difficult to have an even flow of fluid through all of the tubing members which may result from different pressures in the system or due to some of the tubes being partially or fully clogged. When these instances occur whole sections of the absorber plate assembly may be transferring only a small portion or none of the heat which has been collected on these absorber plate sections.

SUMMARY OF THE INVENTION

The novel solar energy collector panel has a unique absorber plate structure. The absorber plate is comprised from a plurality of absorber plate sections each having interlocking structure formed along their lateral edges. This interlocking structure forms a tubular passage when the interlocking structure of the adjacent absorber plate sections are matingly locked together.

The absorber plate sections are made from extruded aluminum and they are substantially identical in shape. This allows an absorber plate of an infinite width to be assembled from these absorber plate sections.

The structure that keeps these absorber plate sections together after they have been interfitted together are elongated tubing members whose external diameter is slightly larger than the internal diameter of the tubular passage formed by the interlocking structure of the adjacent absorber plate sections. These tubing members are made of copper and they are frictionally captured within the tubular passages. During the assembly process, as the copper tube members are pulled through the tubular passages, friction is used to remove any oxidation on the tubing surface and the result is a friction weld that produces better heat conduction. The use of this assembly operation makes it optional whether to give the tubular passages any preparatory coating. If the tubular passages are coated, practically all of the coating will be stripped off when the tubing member is drawn through the tubular passage. Any spots of coating remaining will act to prevent electrolysis. Since the copper tubing is completely protected [i.e. completely surrounded by the tubular passage surfaces of the absorber plate sections], thinner copper tubing than normal can be used. This results in a substantial reduction in price for the tubing.

The absorber plate sections have a plurality of corrugated surface portions that provide the absorber plate sections with greater surface exposure and improved absorption angles to the sun throughout the day. The thickness of the absorber plate sections is also the greatest where the interlocking structure of the adjacent absorber plate sections are matingly locked together, thereby providing a greater mass for heat conduction transfer from the absorber plate sections to the elongated tubing member. By utilizing the novel absorber plate sections and attaching them together in the manner described previously, an absorber plate is formed that allows for complete conductance throughout the entire plate. Thus, in the event that any of the tubing members become partially clogged, the heat from their surrounding absorber plate sections can be transmitted across the absorber plate to other tubular members.

An additional benefit of the novel interlocking structure on the absorber plate sections results from the fact that as the absorber plate is heated, the sections expand toward each other and will lock together even tighter thus producing even better heat conduction.

The novel absorber plate sections can be assembled into an absorber plate of any desired width. Also the novel structure of the components does not require any nuts or bolts or fastening means to hold the absorber plate sections together. This results in a much reduced assembly cost for the solar energy collector panels. The unique interlocking structure of the absorber plate sections also allows an assembled absorber plate to be used as a roof structure that can be exposed to the weather. Since its interlocking connections would be water tight, any rain or moisture would merely drain off the absorber plate rather than drip through the connections between the different absorber plate sections.

DESCRIPTION OF THE DRAWINGS

FIG. 1 is a top plan view of the novel solar energy collector panel having a portion broken away for clarity;

FIG. 2 is a partial sectional perspective view illustrating the novel solar energy collector panel interior;

FIG. 3 is an exploded view of a pair of absorber plate sections prior to assembly; and, FIG. 4 is a perspective view of a portion of the absorber plate.

DESCRIPTION OF THE PREFERRED EMBODIEMENT

Referring to FIGS. 1 thru 4, the novel solar energy collector panel will be described. The solar energy collector panel is generally designated numeral 10. It has a frame comprising extruded side frame members 14 and 16 and extruded end frame members 18 and 20. Covering the back of the solar energy collector panel is a back plate 12 and covering the front of the panel is a glass panel 22.

Within the solar energy collector panel frame is an absorber plate 24, back insulation 30, and side insulation 32.

The absorber plate 24 is comprised of a plurality of absorber plate sections 36 each having interlocking structure formed along their lateral edges. The interlocking structure forms a tubular passage 38 when the interlocking structure of the adjacent absorber plate sections are matingly locked together. An elongated tubing member 40 whose external diameter is slightly larger than the internal diameter of the tubular passage 38 is frictionally captured within the tubular passage 38. Attached to the opposite ends of tubing member 40 are header 25 and 26.

The absorber plate sections have a plurality of corrugated surface portions 42 that provide the absorber plate sections with greater surface exposure and an improved absorption angles to the sun throughout the day.

The interlocking structure formed on the lateral edges of the absorber plate sections comprise a finned portion 50 whose configuration is basically that of a cylindrical tube that has been cut in half longitudinally. A notch or recess 52 is formed adjacent one edge contact surface 53 of the fin sector 50 and a protrusion or a lip 54 is formed adjacent the opposite edge contact surface 55 of the fin sector.

During the assembly operation, the absorber plate sections 36 are brought together with their finned portions 50 in interlocking engagement thereby forming the tubular passage 38. Next the tubular member 40 is grasped along its intersurface and pulled into the tubular passage 40 and through it a predetermined distance with the friction created during this operation removing any oxidation on the outer surface of the tubing member 40. This produces a friction weld between the two members that results in better heat conduction between them. The absorber plates function as heat exchangers and their structure would have wide applications in other environments.

What is claimed is:

1. A solar energy collector panel comprising:
 (a) an absorber plate formed of a plurality of interfittable absorber plate sections,
 (b) each of said absorber plate sections having a fin portion at opposite ends thereof, the fin portion at each end having the shape of a half cylinder cut along the axis of the cylinder, the open end of the half cylinder at one end facing a first direction and the open end of the cylinder at the other end facing in a direction opposite to said first direction whereby the half cylinder of adjacent sections form a cylinder with each other, each of said fins including interfittable means for interfitting with an adjacent plate section when adjacent cylinder halves form a cylinder with each other, and
 (c) a tube having an outside diameter slightly larger than the inside diameter of said cylinder, positioned in said cylinder to force said interfittable means together and to lock said absorber plate sections together around said tube.
 (d) said interfittable means includes a recess at the interior side of said fin and a lip at the outer edge of said fin fittable into a said recess.

2. A solar energy collector panel as recited in claim 1 wherein said absorber plate sections have a plurality of corrugated surface portions that provide the absorber plate sections with greater surface exposure and improved absorption angles to the sun throughout the day.

3. A solar energy collector panel as recited in claim 1 wherein the thickness of the absorber plate sections is the greatest where the interfittable means of the adjacent absorber plate sections are matingly locked together thereby providing a greater mass for heat conduction transfer from the absorber plate sections to the elongated tubing member.

4. A solar energy collector panel is recited in claim 1 further comprising a frame within which said absorber plate is mounted, said frame having a back plate, side frame members, end frame members, and a glass top panel.

5. A solar energy collector panel as set forth in claim 1 wherein the axis of said cylinder is in the plane of the absorber plate.

* * * * *